(12) United States Patent
Aries et al.

(10) Patent No.: US 8,162,244 B2
(45) Date of Patent: Apr. 24, 2012

(54) SHREDDING MACHINE

(75) Inventors: Paul A. Aries, Brierley Hill (GB); Michael D. Sawford, Aylesbury (GB)

(73) Assignee: ACCO UK Limited, Aylesbury (GB)

( * ) Notice: Subject to any disclaimer, the term of this patent is extended or adjusted under 35 U.S.C. 154(b) by 397 days.

(21) Appl. No.: 12/182,488

(22) Filed: Jul. 30, 2008

(65) Prior Publication Data

US 2009/0032629 A1 Feb. 5, 2009

(30) Foreign Application Priority Data

Aug. 2, 2007 (GB) .................................. 0715074.1

(51) Int. Cl.
*A01F 21/00* (2006.01)
*B23Q 11/00* (2006.01)

(52) U.S. Cl. ........................ 241/37.5; 241/100; 241/236

(58) Field of Classification Search .................. 241/100, 241/236, 36, 37.5

See application file for complete search history.

(56) References Cited

U.S. PATENT DOCUMENTS

| | | | |
|---|---|---|---|
| 2,221,516 A | 4/1937 | Hathaway |
| 3,619,537 A | 11/1971 | Hosokawa et al. |
| 3,724,766 A | 4/1973 | Bosland |
| 3,764,819 A | 10/1973 | Muller |
| 3,785,230 A | 1/1974 | Lokey |
| 3,829,850 A | 8/1974 | Guetersloh |
| 3,882,770 A | 5/1975 | Bleasdale |
| 3,947,734 A | 3/1976 | Fyler |
| 4,352,980 A | 10/1982 | Hibari |
| 4,378,717 A | 4/1983 | Schneider et al. |
| 4,489,897 A | 12/1984 | Turner et al. |
| 4,495,456 A | 1/1985 | Vercillo et al. |
| 4,497,478 A | 2/1985 | Reschenhofer et al. |
| 4,650,128 A | 3/1987 | Goldhammer |
| 4,683,381 A | 7/1987 | Dufoug |
| 4,707,704 A | 11/1987 | Allen et al. |
| 4,757,949 A | 7/1988 | Horton |
| 4,814,632 A | 3/1989 | Glaeser |
| 4,815,669 A | 3/1989 | Fujii |
| 4,842,205 A | 6/1989 | Araki |

(Continued)

FOREIGN PATENT DOCUMENTS

CN 2702778 Y 6/2005

(Continued)

OTHER PUBLICATIONS

Pending U.S. Appl. No. 11/867,260, filed Oct. 4, 2007.*

(Continued)

*Primary Examiner* — Bena Miller
(74) *Attorney, Agent, or Firm* — Michael Best & Friedrich LLP.

(57) ABSTRACT

A shredding machine for domestic or office use having a feed passage 3 leading to a cutting mechanism 10, 11 powered by an electric motor, has a thickness measuring device 15 for measuring the thickness of bundles of paper fed through the feed passage and the machine is controlled by a microprocessor which receives signals from the thickness measuring device and prevents the cutting mechanism from being energised if the thickness measured is above a threshold determined by the microprocessor. The microprocessor varies the threshold in accordance with electrical supply voltage, the electric motor temperature and the electric current drawn by the motor during a previous shredding operation, so that the maximum thickness the shredder will accept can be reduced automatically when motor temperature increases or as the effectiveness of the machine deteriorates throughout its working life.

17 Claims, 9 Drawing Sheets

U.S. PATENT DOCUMENTS

| | | | |
|---|---|---|---|
| 4,863,037 A | 9/1989 | Stevens et al. |
| 4,890,797 A | 1/1990 | Fujii et al. |
| 4,914,721 A | 4/1990 | Glaeser |
| 5,017,972 A | 5/1991 | Daughton et al. |
| 5,081,406 A | 1/1992 | Hughes et al. |
| 5,102,057 A | 4/1992 | Ellis, III |
| 5,139,205 A | 8/1992 | Gallagher et al. |
| 5,166,679 A | 11/1992 | Vranish et al. |
| 5,167,374 A | 12/1992 | Strohmeyer |
| 5,186,398 A | 2/1993 | Vigneau, Jr. |
| 5,198,777 A | 3/1993 | Masuda et al. |
| 5,206,627 A | 4/1993 | Kato |
| 5,342,033 A | 8/1994 | Iwata et al. |
| 5,345,138 A | 9/1994 | Mukaidono et al. |
| 5,353,468 A | 10/1994 | Yap |
| 5,397,890 A | 3/1995 | Schueler et al. |
| 5,415,355 A | 5/1995 | Gollwitzer |
| 5,429,313 A | 7/1995 | Schwelling et al. |
| 5,436,613 A | 7/1995 | Ghosh et al. |
| 5,453,644 A | 9/1995 | Yap |
| 5,494,229 A | 2/1996 | Rokos |
| 5,539,322 A | 7/1996 | Zoughi et al. |
| 5,662,280 A | 9/1997 | Nishio et al. |
| 5,743,521 A | 4/1998 | Munakata et al. |
| 5,765,765 A | 6/1998 | Tamura et al. |
| 5,772,129 A | 6/1998 | Nishio et al. |
| 5,775,605 A | 7/1998 | Tsai |
| 5,823,529 A | 10/1998 | Mandel et al. |
| 5,850,342 A | 12/1998 | Nakamura et al. |
| 5,924,637 A | 7/1999 | Niederholtmeyer |
| D412,716 S | 8/1999 | Kroger |
| 5,942,975 A | 8/1999 | Sorenson |
| D414,198 S | 9/1999 | Iwata |
| 5,988,542 A | 11/1999 | Henreckson |
| 6,065,696 A | 5/2000 | Tsai |
| D426,805 S | 6/2000 | Iwata |
| 6,079,645 A | 6/2000 | Henreckson |
| 6,116,528 A | 9/2000 | Schwelling |
| 6,141,883 A | 11/2000 | Mitchell et al. |
| 6,265,682 B1 | 7/2001 | Lee |
| 6,376,939 B1 | 4/2002 | Suzuki et al. |
| 6,418,004 B1 | 7/2002 | Mather et al. |
| 6,550,701 B1 | 4/2003 | Chang |
| 6,561,444 B1 | 5/2003 | Yokomine et al. |
| 6,601,787 B1 | 8/2003 | Langenecker |
| 6,655,943 B1 | 12/2003 | Peterson |
| 6,666,959 B2 | 12/2003 | Uzoh et al. |
| 6,676,460 B1 | 1/2004 | Motsenbocker |
| 6,698,640 B2 | 3/2004 | Hakozaki et al. |
| 6,724,324 B1 | 4/2004 | Lambert |
| 6,802,465 B1 | 10/2004 | Norcott et al. |
| 6,813,983 B2 | 11/2004 | Gass et al. |
| 6,826,988 B2 | 12/2004 | Gass |
| 6,857,345 B2 | 2/2005 | Gass |
| 6,877,410 B2 | 4/2005 | Gass et al. |
| 6,880,440 B2 | 4/2005 | Gass et al. |
| 6,920,814 B2 | 7/2005 | Gass et al. |
| 6,979,813 B2 | 12/2005 | Avril |
| 6,983,903 B2 | 1/2006 | Chang |
| 6,997,408 B2 | 2/2006 | Watano |
| 7,025,293 B2 | 4/2006 | Matlin et al. |
| 7,040,559 B2 | 5/2006 | Matlin |
| 7,166,561 B2 | 1/2007 | Allen |
| 7,311,276 B2 | 12/2007 | Matlin et al. |
| 7,325,757 B2 | 2/2008 | Allen et al. |
| 7,490,786 B2 | 2/2009 | Matlin et al. |
| 7,520,452 B2 | 4/2009 | Watano et al. |
| 7,584,545 B2 | 9/2009 | Pan |
| 7,624,938 B2 | 12/2009 | Aries et al. |
| 7,631,822 B2 | 12/2009 | Matlin et al. |
| 7,631,823 B2 | 12/2009 | Matlin et al. |
| 7,631,824 B2 | 12/2009 | Matlin et al. |
| 7,635,102 B2 | 12/2009 | Matlin et al. |
| 7,661,612 B2 | 2/2010 | Lee et al. |
| 7,661,614 B2 | 2/2010 | Matlin et al. |
| 7,663,769 B2 | 2/2010 | Hayashihara et al. |
| 7,712,688 B2 | 5/2010 | Priester |
| 7,712,689 B2 | 5/2010 | Matlin et al. |
| 7,731,112 B2 | 6/2010 | Matlin et al. |
| 7,823,815 B2 | 11/2010 | Jensen |
| 7,823,816 B2 | 11/2010 | Jensen |
| 7,828,235 B2 | 11/2010 | Matlin et al. |
| 7,850,106 B2 | 12/2010 | Matlin |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0069734 A1 | 6/2002 | Gass et al. |
| 2002/0170399 A1 | 11/2002 | Gass et al. |
| 2002/0170400 A1 | 11/2002 | Gass |
| 2002/0190581 A1 | 12/2002 | Gass et al. |
| 2003/0002942 A1 | 1/2003 | Gass et al. |
| 2003/0005588 A1 | 1/2003 | Gass et al. |
| 2003/0015253 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0056853 A1 | 3/2003 | Gass et al. |
| 2003/0058121 A1 | 3/2003 | Gass et al. |
| 2003/0090224 A1 | 5/2003 | Gass et al. |
| 2003/0131703 A1 | 7/2003 | Gass et al. |
| 2003/0140749 A1 | 7/2003 | Gass et al. |
| 2003/0196824 A1 | 10/2003 | Gass et al. |
| 2004/0008122 A1 | 1/2004 | Michael |
| 2004/0040426 A1 | 3/2004 | Gass et al. |
| 2004/0069883 A1 | 4/2004 | Watanabe et al. |
| 2004/0159198 A1 | 8/2004 | Peot et al. |
| 2004/0163514 A1 | 8/2004 | Gass et al. |
| 2004/0173430 A1 | 9/2004 | Gass |
| 2004/0194594 A1 | 10/2004 | Dils et al. |
| 2004/0226800 A1 | 11/2004 | Pierga et al. |
| 2005/0039586 A1 | 2/2005 | Gass et al. |
| 2005/0039822 A1 | 2/2005 | Gass et al. |
| 2005/0041359 A1 | 2/2005 | Gass |
| 2005/0066784 A1 | 3/2005 | Gass |
| 2005/0103510 A1 | 5/2005 | Gass et al. |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0150986 A1 | 7/2005 | Castronovo |
| 2005/0155473 A1 | 7/2005 | Gass |
| 2005/0166736 A1 | 8/2005 | Gass et al. |
| 2005/0263630 A1 | 12/2005 | Zhang et al. |
| 2006/0016919 A1 | 1/2006 | Castronovo |
| 2006/0054724 A1 | 3/2006 | Matlin et al. |
| 2006/0054725 A1 | 3/2006 | Matlin |
| 2006/0091247 A1 | 5/2006 | Matlin |
| 2006/0219827 A1 | 10/2006 | Matlin et al. |
| 2006/0243631 A1 | 11/2006 | Duke |
| 2007/0007373 A1 | 1/2007 | Matlin |
| 2007/0025239 A1 | 2/2007 | Jain et al. |
| 2007/0063082 A1 | 3/2007 | Coleman |
| 2007/0080252 A1 | 4/2007 | Pierce et al. |
| 2007/0087942 A1 | 4/2007 | Allen |
| 2007/0164135 A1 | 7/2007 | Zhong |
| 2007/0164138 A1 | 7/2007 | Allen |
| 2007/0215728 A1 | 9/2007 | Priester |
| 2007/0221767 A1 | 9/2007 | Matlin |

| | | | | | | |
|---|---|---|---|---|---|---|
| 2007/0246582 | A1 | 10/2007 | Aries et al. | JP | 4180852 | 6/1992 |
| 2008/0093487 | A1* | 4/2008 | Lee et al. ............... 241/36 | JP | 5-96198 | 4/1993 |
| 2008/0169370 | A1 | 7/2008 | Aries et al. | JP | 5092144 | 4/1993 |
| 2008/0231261 | A1 | 9/2008 | Dengler et al. | JP | 6277548 | 10/1994 |
| 2009/0025239 | A1 | 1/2009 | Pan | JP | 7299377 | 11/1995 |
| 2009/0090797 | A1 | 4/2009 | Matlin et al. | JP | 8108088 | 4/1996 |
| 2010/0025509 | A1 | 2/2010 | Matlin et al. | JP | 8131861 | 5/1996 |
| 2010/0032505 | A1 | 2/2010 | Jensen et al. | JP | 8131862 A2 | 5/1996 |
| 2010/0051731 | A1* | 3/2010 | Matlin et al. ............. 241/36 | JP | 08-164343 | 6/1996 |
| 2010/0084496 | A1 | 4/2010 | Matlin et al. | JP | 9-38513 | 2/1997 |
| 2010/0102153 | A1 | 4/2010 | Matlin et al. | JP | 90-38513 A | 2/1997 |
| 2010/0134805 | A1 | 6/2010 | Pan | JP | 09150069 | 10/1997 |
| 2010/0140383 | A1 | 6/2010 | Matlin et al. | JP | 9262491 | 10/1997 |
| 2010/0170967 | A1 | 7/2010 | Jensen | JP | 63-173342 | 11/1997 |
| 2010/0170968 | A1 | 7/2010 | Andrews et al. | JP | 10048344 | 2/1998 |
| 2010/0170969 | A1 | 7/2010 | Jensen et al. | JP | 11216383 | 8/1999 |
| 2010/0170970 | A1 | 7/2010 | Romanovich | JP | 11304942 | 11/1999 |
| 2010/0176227 | A1 | 7/2010 | Davis et al. | JP | 20000346288 | 12/2000 |
| 2010/0181398 | A1 | 7/2010 | Davis et al. | JP | 2002239405 | 8/2002 |
| 2010/0213296 | A1 | 8/2010 | Sued et al. | JP | 2004321840 A2 | 11/2004 |
| 2010/0213297 | A1 | 8/2010 | Sued et al. | JP | 2004321993 | 11/2004 |
| 2010/0213300 | A1 | 8/2010 | Matlin et al. | WO | 9308356 | 4/1993 |
| 2010/0252661 | A1 | 10/2010 | Matlin et al. | WO | 00/12954 | 3/2000 |
| 2010/0252664 | A1 | 10/2010 | Matlin et al. | WO | 2005070553 | 8/2005 |
| 2010/0270404 | A1 | 10/2010 | Chen | WO | 2006019985 | 2/2006 |
| 2010/0282879 | A1 | 11/2010 | Chen | WO | 2006031324 | 3/2006 |
| 2010/0288861 | A1 | 11/2010 | Cai et al. | WO | 2006036370 | 4/2006 |
| 2010/0320297 | A1 | 12/2010 | Matlin et al. | WO | 2007109753 | 9/2007 |
| 2010/0320299 | A1 | 12/2010 | Matlin et al. | WO | 2007122364 | 11/2007 |
| 2010/0327092 | A1 | 12/2010 | Romanovich | WO | 2007137761 | 12/2007 |
| 2011/0049277 | A1 | 3/2011 | Matlin et al. | | | |
| 2011/0186663 | A1 | 8/2011 | Matlin et al. | | | |

FOREIGN PATENT DOCUMENTS

| | | |
|---|---|---|
| DE | 3313232 | 10/1984 |
| DE | 8619856.4 | 9/1988 |
| DE | 4121330 | 1/1993 |
| DE | 4207292 | 1/1993 |
| DE | 4237861 | 5/1994 |
| DE | 4437348 | 4/1996 |
| DE | 19525027 A1 | 1/1997 |
| DE | 19835093 A1 | 2/1999 |
| DE | 19746847 A1 | 4/1999 |
| DE | 202004000907 | 5/2005 |
| DE | 202006012363 | 10/2007 |
| DE | 102006036136 | 1/2008 |
| DE | 202010001577 | 11/2010 |
| EP | 268244 | 5/1988 |
| EP | 855221 | 7/1988 |
| EP | 0442727 | 8/1991 |
| EP | 0562076 | 9/1993 |
| EP | 0392867 B1 | 8/1995 |
| EP | 524708 | 1/1997 |
| EP | 818241 | 1/1998 |
| EP | 856945 | 8/1998 |
| EP | 1177832 | 2/2002 |
| EP | 1195202 | 4/2002 |
| GB | 1199903 | 7/1970 |
| GB | 2171029 | 8/1986 |
| GB | 2209963 | 6/1989 |
| GB | 2437594 | 10/2007 |
| GB | 2442942 | 4/2008 |
| GB | 2440651 | 6/2008 |
| JP | 5211691 | 1/1977 |
| JP | 5776734 | 1/1982 |
| JP | 57-70445 | 4/1982 |
| JP | 57070445 U | 4/1982 |
| JP | 58223448 A | 12/1983 |
| JP | 1297155 A2 | 11/1989 |
| JP | 2-277560 | 11/1990 |
| JP | 2-303550 | 12/1990 |
| JP | 2303552 A2 | 12/1990 |
| JP | H2-303550 | 12/1990 |
| JP | 4157093 | 5/1992 |

OTHER PUBLICATIONS

Manual Translation of Japanese Unexamined Patent Application Publication No. 2004-321993, published Nov. 18, 2004.
ACCO REXEL, Mainstream 1050/2150/2250/3150/3250 and 3350, 115V Machines Illustrated Parts Lists And Service Instructions, 2002, 100 pages, admitted prior art.
ACCO REXEL, Deckside And Office 115V Machines Illustrated Parts Lists And Service Instructions, 1999, 84 pages, admitted prior art.
ACCO REXEL, Deckside And Office 230V Machines Illustrated Parts Lists And Service Instructions, 1999, 78 pages, admitted prior art.
International Search Report and Written Opinion for PCT/US2005/028290 dated Nov. 21, 2005.
International Search Report for PCT/GB2006/004286 dated Jan. 31, 2007.
United Kingdom Search Report and Examination Opinion for GB0608072.5 dated Aug. 9, 2007.
United Kingdom Search Report for GB0715074.1 dated Nov. 20, 2007.
Manual Translation of Japanese application 2002-239405, published Aug. 27, 2002.
European Search Report for EP08161058.6 dated Feb. 3, 2009.
Manual translation of Japanese Utility Model Public Disclosure No. S57-70445, published Apr. 28, 1982.
Materials provided to ACCO Brands Corporation on Mar. 5, 2011, Amendment to Test Report, Date of Issue: Aug. 2, 2007, 5 pages, and photograph, 1 page (with statement of relevance).
Preliminary Amendment and Applicant's Suggestion of an Interference with U.S. Appl. No. 12/182,488 Under 37 CFR §41.202, filed on Feb. 25, 2011 for Fellowes Inc. U.S. Appl. No. 12/732,899, 25 pages.
GBC Shredmaster Service Manual, Part #6001054, Referencing Model 2230S and 2250XX Paper Shredders, Nov. 1997, 19 pages.
The Stationery and Business Machines—Japan, "DS-4000 by Carl Jimuki K.K." Jun. 2003.
The Stationery and Business Machines—Japan, "NSE-501CN by Nakbayashi K.K." Oct. 2004.

* cited by examiner

SHREDDING MACHINE

BACKGROUND

THE PRESENT INVENTION relates to a shredding machine for shredding sheet material. The present invention relates particularly, but not exclusively, to a shredding machine in the form of a paper-shredder suitable for home or office use.

Over recent years it has been customary to provide shredding machines in domestic homes or work places such as offices, in order to provide a convenient method of securely disposing of confidential documentation or other sensitive papers.

Conventional paper shredders of the type mentioned above are provided with a paper feed-aperture, particularly in the form of a feed-slot of elongate form, through which a plurality of paper sheets or the like can be fed towards a pair or rotating cutters located below the feed-slot which serve to shred the paper sheets into a plurality of strips having a width of only a few millimeters, the resulting strips of paper being collected in a basket or bin located below the cutters. For reasons of space and economy, the cutting mechanisms used in conventional paper shredders of this type are only effective in shredding stacks of paper or card up to a relatively small predetermined thickness. If a stack of papers or cards exceeding this predetermined thickness is inserted into the feed-slot, for example by being force-fed into the slot by an over-enthusiastic user, it is possible to present the shredding mechanism with such a bulk of material so as to overload the mechanism and stall the driving motor or otherwise jam the mechanism. Not only can paper-jams of this type represent an annoyance to a person using the paper shredder, but they can serve to damage the cutting mechanism, for example by distorting the shafts of the cutters or damaging the cutting blades.

In co-pending International Patent Application PCT/GB06/004286, the applicants have disclosed an anti-jam mechanism to prevent overloading of a paper shredder by inserting sheet material of too great a thickness in the manner described above. The shredding machine of PCT/GB06/004286 comprises a feed passage extending from a feed aperture and further comprises a cutting mechanism driven by an electric motor, the feed aperture and feed passage being configured to receive multiple sheets and to direct said sheets towards the cutting mechanism for shredding. This machine is provided with an actuating element part of which extends into the feed passage and which is movable from a first position in which the actuating element permits energisation of the cutting mechanism, past a second position beyond which the actuating element prevents energisation of the cutting mechanism. The actuating element is biased towards its first position and is arranged to actuate a switch when moved past said second position, to break the electrical circuit providing power to the cutting mechanism. The shredding machine of PCT/GB06/004286 thus has a threshold thickness of superimposed sheets such that the machine will not attempt to shred a stack of superimposed sheets if the stack has a thickness above that threshold, herein referred to as the anti-jam threshold.

The applicants have found, however, that the machine of PCT/GB06/004286 suffers from the following problems, in common with prior art shredders without the anti-jam system of PCT/GB06/004286, namely:—

Where the shredder is powered from a main supply, there is the difficulty that mains supply voltage is variable, within a certain tolerance, with the result that the maximum sheet capacity, in practice, of the mains driven electrical shredder will be less when the mains voltage is at the lower end of its tolerance range than when the voltage is at the higher end of that range.

The temperature of the electric motor driving the shredder rises during use, causing the motor to be less efficient after a period of use, producing a drop in output power and hence a drop in sheet capacity.

During the life of the shredder, the cutting unit and transmission system wear and become less efficient, the cutting mechanism clogs with paper dust and lubrication dries out or wears off, all of which place a greater load on the motor, again resulting in a drop in sheet capacity.

In view of the above factors, the applicants found it necessary to set the anti-jam threshold, i.e. the thickness threshold at which the actuating mechanism operated to prevent energisation of the cutting mechanism, at a "worst-case" level and thus significantly below the actual cutting capacity of the cutting mechanism under conditions better than the "worst case" set of conditions.

SUMMARY

The present invention provides an improved shredding machine in which the above difficulty is avoided.

According to one aspect of the invention there is provided a shredding machine for shredding sheet material, the machine comprising a feed aperture and a cutting mechanism powered by an electric motor, the feed aperture being arranged to receive sheets for shredding and to direct such sheets to the cutting mechanism for shredding, the machine having means for measuring the thickness of sheet material passed into said feed aperture for shredding which sheet material may comprise a plurality of superimposed sheets which together provide such thickness, said measuring means controlling said cutting mechanism so as to permit energisation of the cutting mechanism where the thickness of sheet material measured thereby is below a controlling threshold, (herein referred to as the optimal sheet capacity threshold), and to prevent such energisation where the thickness of sheet material measured is above said controlling threshold, characterised in that the machine includes at least one sensor sensing a variable parameter relevant to such shredding and means operable to adjust said controlling threshold automatically in dependence upon the value of the parameter sensed.

According to a further aspect of the invention there is provided a machine for processing sheet material, fed through a feed passage, the machine being characterised by means for measuring the thickness of sheet material fed through said passage, said measuring means including an actuating element which is movable from a first limiting position, engaging or relatively close to, one major wall of said passage, away from said major wall, against a biasing force acting on said element, and means for measuring displacement of said actuating element from said limiting position.

Preferably, said means for measuring displacement of said actuating element comprises a member provided with a series of markers of alternately high and low light transmissivity or of alternatively high and low light reflectivity and optical sensing means sensitive to the passage of said markers through a measuring zone, said member being part of, or mechanically coupled with, said element so that the displacement of said actuating element will cause said markers to traverse said measuring zone, the apparatus including counting means operable to count displacement of said markers through said measuring zone.

In a preferred embodiment of the present invention, a shredding machine incorporates a microprocessor receiving signals from various sensors, the microprocessor being arranged to vary the optimal sheet capacity threshold setting according to the signals from the various sensors, which may include a mains supply voltage sensor, whereby the system microprocessor will adjust the optimal sheet capacity threshold so as to allow larger quantities of paper to be shredded per pass than when the mains supply voltage is low and a temperature sensor fitted to the electric motor powering the shredder to monitor motor temperature, whereby the system processor can vary the threshold setting depending on motor temperature so that when the motor is cold, the system will allow a greater thickness of paper to be passed at the same time through the shredding mechanism than when the motor is hot. Furthermore, in the preferred embodiment, a current sensor is incorporated in the electric motor circuit, to monitor increase in the motor current drawn by the motor as the shredder wears and to lower the optimal sheet capacity threshold setting as the motor current drawn increases, so that the shredder will allow a greater thickness of paper to pass through the cutting mechanism when the machine is new than when the cutting mechanism has worn and the average motor current drawn has increased.

In order to deal with a variable "optimal sheet capacity" thickness threshold or trigger point for the optimal sheet capacity mechanism, the movement of the actuator in the feed passage, due to deflection by the thickness of a stack of paper for shredding, must be measured quantitatively. In the preferred embodiment of the present invention, such movement is converted into an electronic digital count, using infrared sensors and a slotted disc operating in a manner similar to the sensing arrangement conventionally employed in a trackerball computer mouse. Thus, the actuator will measure the actual thickness of paper presented and the system microprocessor will calculate whether the cutting head will be capable of shredding that thickness, taking into account the voltage, temperature and current sensed by the respective sensors. Based on this calculation, the system will either start the shredder in a forward direction allowing the inserted paper to be shredded or, if the thickness of paper inserted is too great for the shredder to deal with, then the shredder will not start and a warning signal will be given to the operator.

Conveniently, the shredding machine comprises at least one pair of rollers positioned in between the feed aperture and the cutting mechanism such that sheets being directed towards the cutting mechanism pass between the rollers, upstream of the cutting mechanism.

Conveniently, a pair of said rollers is located adjacent the feed aperture.

Conveniently, the shredding machine is further provided with indicating means to provide a visual indication to a user of the machine that energisation of the cutting mechanism is prevented by the optimal sheet capacity facility.

Preferably, the shredding machine is provided in the form of a paper-shredder suitable for home or office use.

BRIEF DESCRIPTION OF THE DRAWINGS

So that the invention may be more readily understood, and so that further features thereof may be appreciated, embodiments of the present invention will now be described, by way of example, with reference to the accompanying drawings, in which.

DETAILED DESCRIPTION

Figure 1:
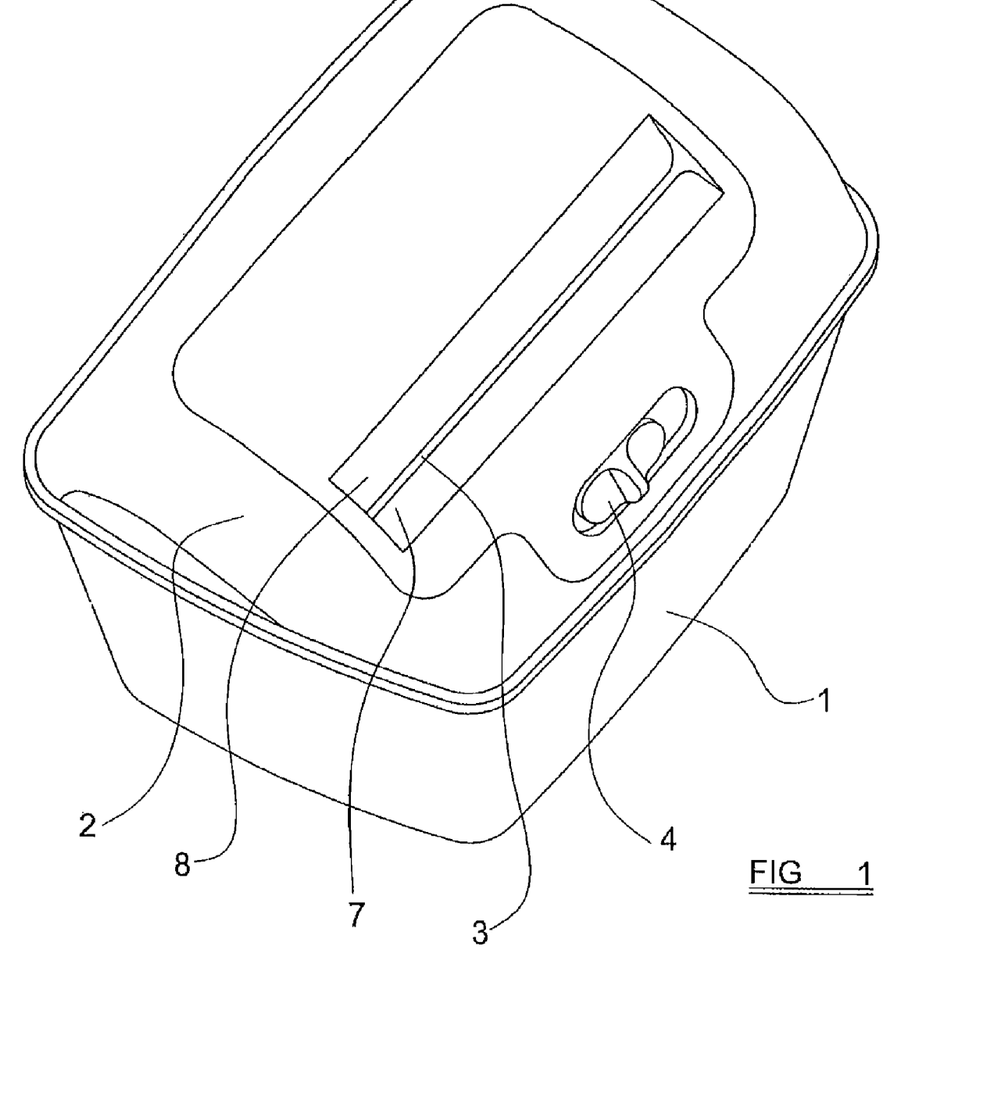
FIG. 1 is a perspective view from above of a shredding machine in accordance with the present invention, taking the form of a paper-shredder for home or office use.

Referring initially to FIG. 1, there is illustrated a shredding machine in accordance with the present invention, provided in the form of a domestic or office paper-shredder. FIG. 1 illustrates the paper-shredder from above.

The shredding machine comprises a relatively large plastic container or bin 1, on top of which sits a housing 2 inside which the operative parts of the paper shredder are located, as will be described in more detail hereinafter. The housing 2 is provided with a feed slot or passage 3 which provides an elongate entrance aperture having a length sufficient to accommodate sheets of appropriate size to be shredded by the machine. During operation, sheet material to be shredded, such as sheets of paper or card or the like, is inserted into the paper feed slot to pass into the feed passage or chute, where the sheets are drawn into the shredding mechanism in a manner known per se and shredded into a plurality of strips which then exit the shredding mechanism from the bottom of the housing 2 so as to fall from the housing and be collected in the bin 1 located therebelow.

FIG. 1 also illustrates an operating switch 4 which, in the embodiment illustrated, takes the form of a simple sliding switch. The switch 4 is operable by a person using the shredding machine in order to switch the machine on and off.

The features of the shredding machine described above with reference to FIG. 1 are conventional.

Figure 2:
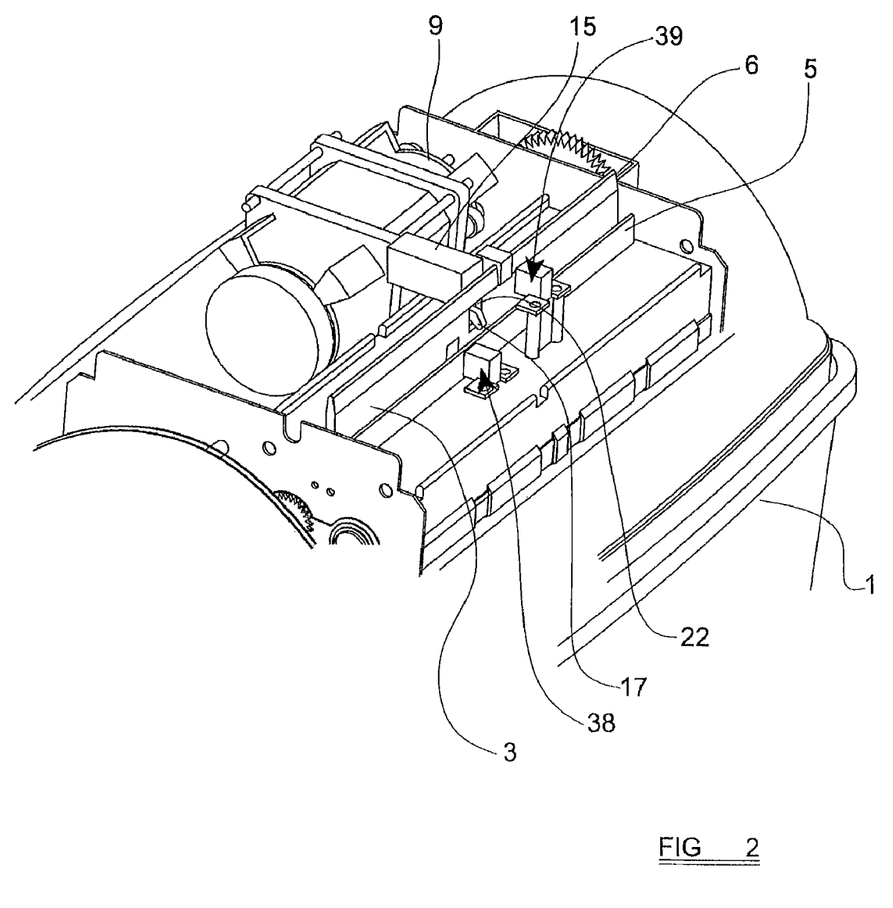
FIG. 2 is a perspective view from above of the paper-shredder of FIG. 1, illustrating the arrangement with a top cover of the machine removed.

FIG. 2 illustrates the internal workings of the shredding machine in more detail, with the upper part of the housing 2 having been removed.

The feed slot or feed passage 3 is defined, in the absence of the top part of the housing 2, by a pair of substantially parallel upstanding feed walls 5, 6. As can be seen from FIG. 2, in the embodiment illustrated, the upper edge of the front feed wall 5 is located below the level of the upper edge of the rear feed wall 6. The two feed walls 5, 6 are spaced apart from one another by a distance slightly greater than the maximum thickness of sheet material which the shredding machine is capable of shredding, as will be described in more detail hereinafter.

As will be appreciated from a comparison of FIGS. 1 and 2, when the top part of the housing 2 is placed over the inner workings of the shredding machine, the region of the housing 2 defining the opening to the feed slot 3 is aligned with and overlies the space defined between the feed walls 5, 6. In fact, this region of the upper housing 2 is preferably moulded from the plastics material in such a manner that inwardly-directed lips 7, 8 extend part-way down the inwardly-directed face of respective feed walls 5, 6 so as to define a smooth and uninterrupted opening into the feed slot. This is also illustrated more clearly in FIG. 3.

FIG. 2 also illustrates part of an electric motor 9 which is mounted to the rear of the feed slot 3. The motor 9 is connected, via a gear arrangement, to a pair of elongate rotatable cutters 10, 11 which are arranged for counter-rotation relative to one another in a region below the feed slot 3, as illustrated most clearly in FIG. 3. Each cutter 10,11 is generally cylindrical in form and is provided with a plurality of spaced-apart cutting discs 12 along its length, the cutting discs of one cutter being interposed between those of the other cutter. Hence, in FIG. 3, which is a sectional view taken through the central region of the shredding machine, only one cutting disc 12 is visible. However, it will be seen that this cutting disc is provided with a number of cutting teeth 13 at spaced apart positions around its periphery.

Figure 3:
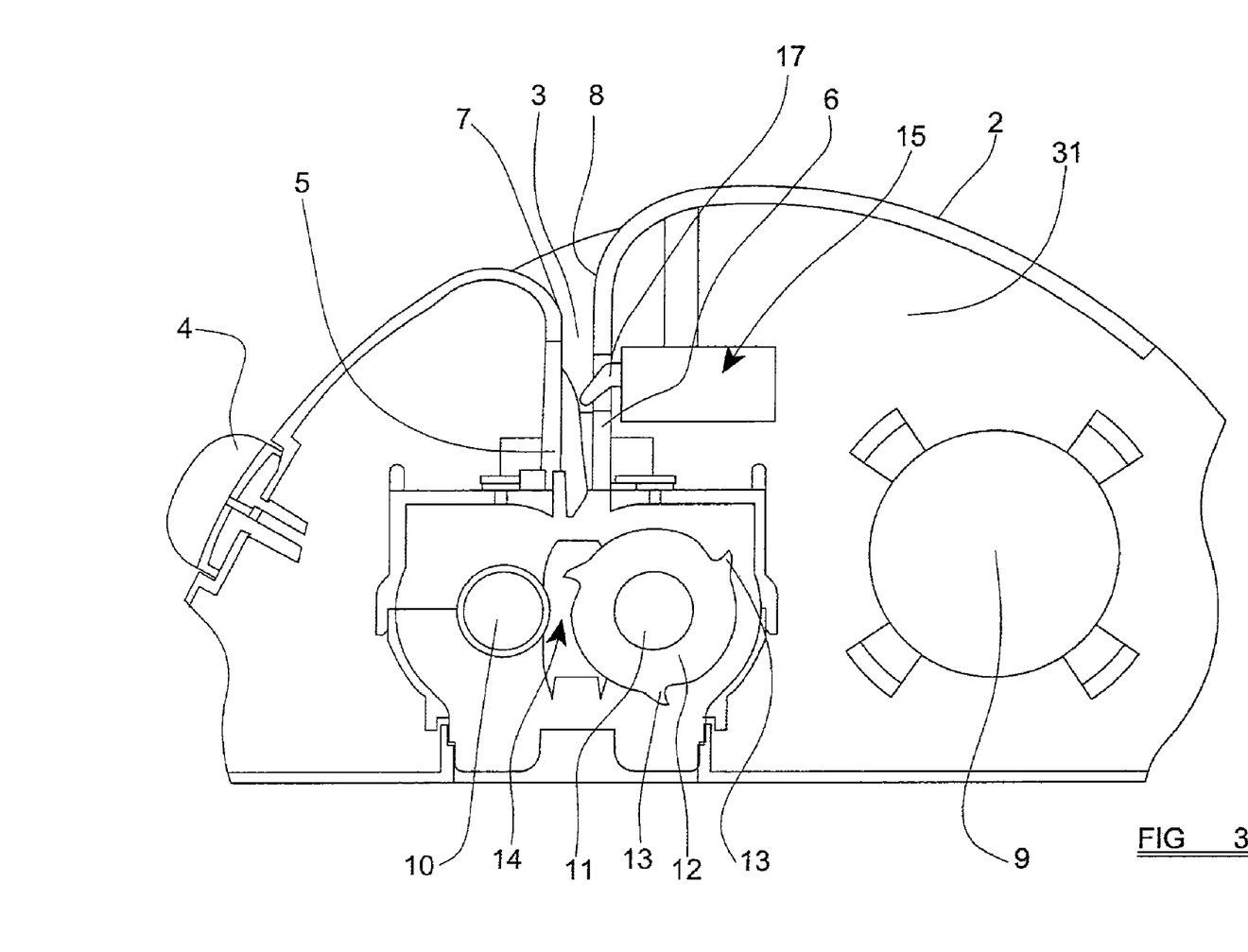
FIG. 3 is a transverse cross-sectional view taken through the middle of the paper-shredder illustrated in FIG. 1, viewed from the right-hand end of the machine as illustrated in FIG. 1.

Upon energisation of the electric motor 9, the two cutters 10, 11 are caused to rotate, such that the forwardmost cutter 10 rotates in a clockwise sense as viewed in FIG. 3, whilst the rearmost cutter 11 rotates in a counter-clockwise sense as viewed in FIG. 3. In this manner, the two cutters 10, 11 are arranged to pull sheet material passing through the feed slot 3, through the nip 14 defined between the two cutters 10, 11.

As also illustrated in FIGS. 2 and 3, a thickness gauging device 15 is provided which includes a member having an actuating element in the form of an arm 17, which extends into the feed passage 3 and has an upper surface 18 which, in the orientation of the actuating arm 17 illustrated in FIG. 3, slopes forwardly and downwardly. The arm 17 extends through a vertically-oriented slot 22 through the rear feed wall 6 and into the feed slot 3 defined between the rear feed wall 6 and the front feed wall 5.

The actuating arm 17 is spring biased into the feed passage 3 and is free to extend, under the spring bias, so far into the feed passage 3 as to engage the opposing wall 5 of the feed passage in the absence of any paper sheets to be shredded. This makes possible a self-calibrating function as described below.

Although not essential to the operation of the present invention, it will be seen from the accompanying drawings that the shredding machine is also provided with a pair of photo-sensors, indicated generally at 38 and 39 in FIG. 2, which are arranged on either side of the actuating arm 17 so as to direct a beam of light such as infra-red light across the feed slot from one side and detect its arrival on the other side. In the arrangement illustrated, the first photo-sensor 38 is arranged so as to be operative across the feed slot at a level below the vertical slot 22 through which the actuating arm 17 projects into the feed slot 3. The other photo-sensor 39 is arranged so as to be operative across the feed slot at a level above the vertical slot 22 through which the actuating arm projects into the feed slot. The function of the two photo-sensors 38, 39 can be varied at the manufacturing stage of the paper shredder, depending upon the desired functionality of the shredder. In one proposed arrangement, the higher level photo-sensor 39 is arranged so as to simply detect the presence of paper in the feed slot, whilst the lower level photo-sensor provides a signal on the basis of which the electric motor 9 may be energised to set the cutting mechanism in motion as the leading edge of a sheet of paper or stack of papers passes the photo sensor, and to detect the passage of the trailing edge of the sheet or stack upon shredding. (The machine is arranged to stop the electric motor after a predetermined time has elapsed following movement of such trailing edge past the lower level sensor 38.

In the embodiment of the present invention under discussion, the shredding machine incorporates a microprocessor which controls energisation of the electric motor driving the cutting mechanism and the feed mechanism and which, on the basis of various sensors (see below) establishes, as an optimal sheet capacity threshold, a maximum thickness of a stack or bundle of paper sheets or the like which, for prevailing conditions, the machine can comfortably deal with. Measuring the thickness of a stack of paper sheets inserted is effected by the device 15 and associated circuitry which provides corresponding information to the microprocessor.

A stack of paper sheets or the like can be inserted into the feed slot to pass between the walls 5 and 6 for engagement by the cutting mechanism therebelow, the cutting mechanism being switched on and off in response to signals from the lower level photo sensor 38, (which signals are also sent to the microprocessor). If the thickness of the stack of papers inserted into the feed slot is less than the currently determined optimal sheet capacity threshold, then the cutting mechanism will be switched on and the stack of sheets shredded. However, should a stack of papers be inserted into the feed slot which stack has a thickness greater than the currently determined optimal sheet capacity threshold, as determined by displacement of the actuating arm 17, then the microprocessor will terminate supply of electricity to the motor driving the cutting mechanism and will activate an alarm signal to alert the operator to the fact that too thick a stack of paper sheets had been inserted.

The stack of paper sheets inserted into the feed slot will pass between the wall 5 and the surface 18 of the actuating arm 17 thereby urging the actuating arm to move against its spring and so to generate signals to the microprocessor from which the latter can determine how far the actuating arm has moved and thus determine the thickness of the stack of sheets inserted. As noted above, the microprocessor thus prevents operation of the cutting mechanism located below the feed slot, even when the leading edge of the stack passes the lower level photo sensor 38 which would, if the stack of papers was not of excessive thickness, trigger operation of the cutting mechanism.

Figure 4:
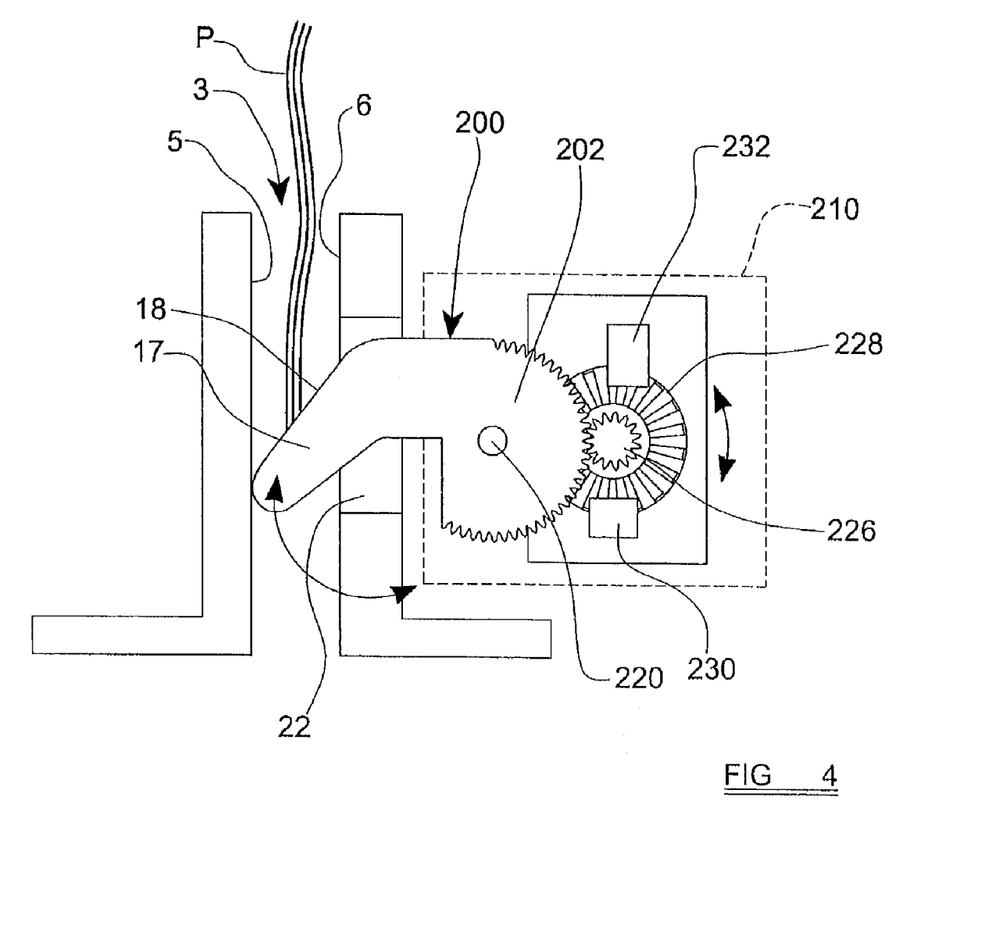
FIG. 4 is a sectional view which shows to a larger scale and somewhat schematically part of FIG. 3 including a device for measuring the thickness of a bundle of papers passed into the shredder for shredding.

In one form of the thickness measuring device 15 shown schematically in FIG. 4, the actuating arm 17 is part of an element 200 including a gear segment 202. The element 200 is mounted in a casing 210 indicated in broken lines, for rotation about the axis of a shaft 220. The element 200 is biased, e.g. by a spring (not shown), in a clockwise sense in FIG. 4 so as to extend the arm 17 through the slot 22 and across the passage 3 to abut the wall 5 of the passage 3 of the shredder in the absence of any sheet in the passage 3 to be shredded. In this position, the upper surface 18 of the arm 17 extends at an angle downwardly from the slot 22 so as to be readily displaceable anti-clockwise in FIG. 4 by paper sheets P passed into the passage between the wall 5 and arm 17. The gear segment 202 meshes with a pinion 226 of relatively small radius which is fixed to a sensing wheel or disc 228 coaxial with pinion 226 and rotatable in housing 210 about an axis parallel with that of the shaft 220. It will be understood that the disc 228 lies in a plane slightly behind that of the element 200 furthest from the viewer in FIG. 4, so that the element 200 overlaps the disc 228 which extends behind the element 200 in FIG. 4.

With the arrangement illustrated in FIG. 4, a relatively slight angular rotational movement of element 200 about the axis of shaft 220 will produce a significant rotational movement of the disc 228. The disc 228 is provided with an annular track comprising a plurality of equally spaced radially extending slots around the disc. Two optical signal sensors 230, 232, straddle the disc to detect passage of the slots as the disc 228 rotates. Each sensor 230, 232 comprises a light source such as a LED and a photo detector such as a photo-diode, on opposite sides of the disc so that as the disc rotates light passes periodically through the slots in the disc from the respective LED to the respective photo detector. The arrangement used is similar to that used in a conventional tracker ball computer mouse and, as in such a mouse, the sensors 230, 232 are positioned relative to one another and to the disc in such a way that, as the disc rotates, the signals from one sensor due to sensing the passage of the slots are somewhat out of phase with the signals from the other sensor, whereby the processor can determine the direction of rotation of the disc as well as the extent of rotation (by counting the signals).

Figure 5:
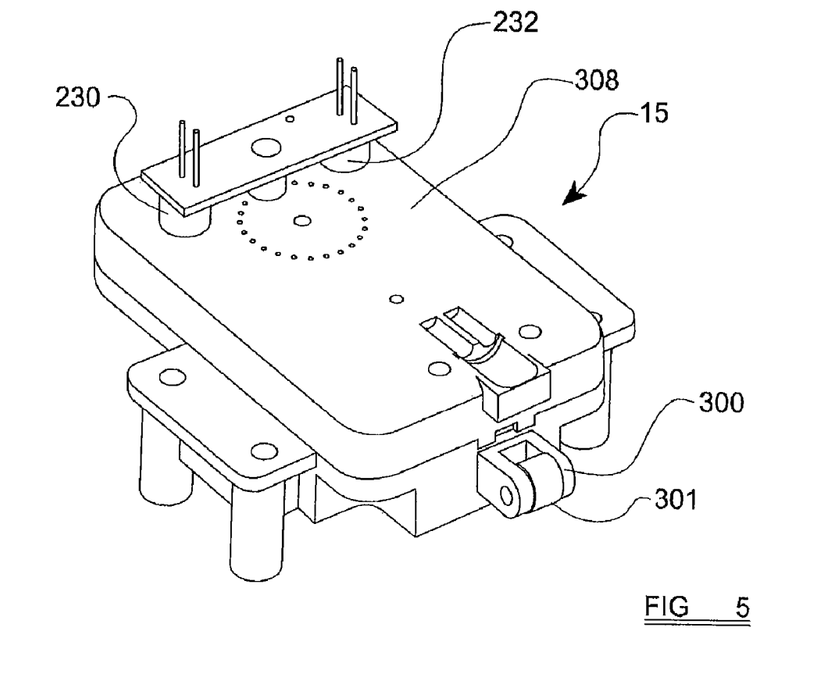
FIG. 5 is a perspective view from above of an alternative form of thickness measuring device.
Figure 6:
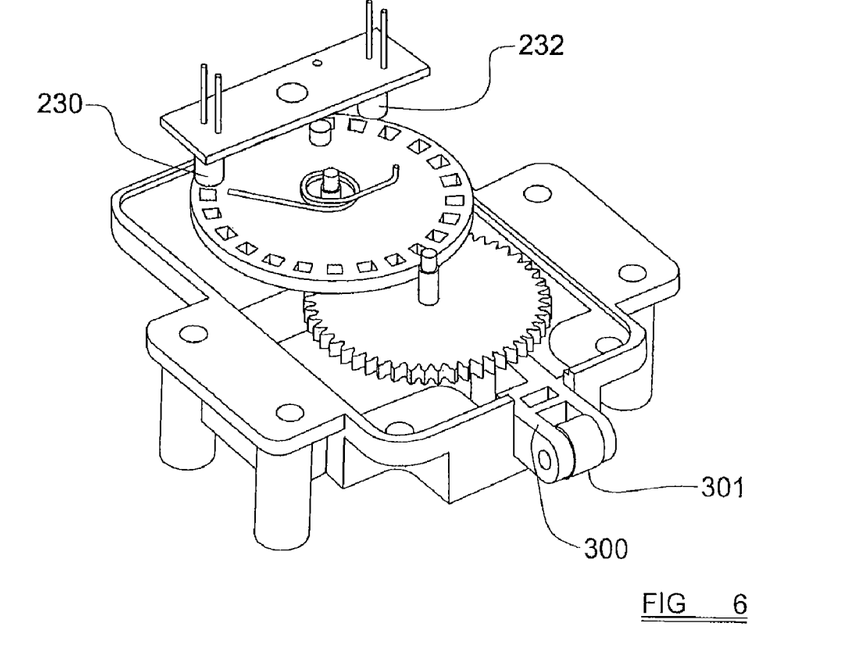
FIG. 6 is a perspective view corresponding to FIG. 5 but with part of the casing of the device removed.
Figure 7:
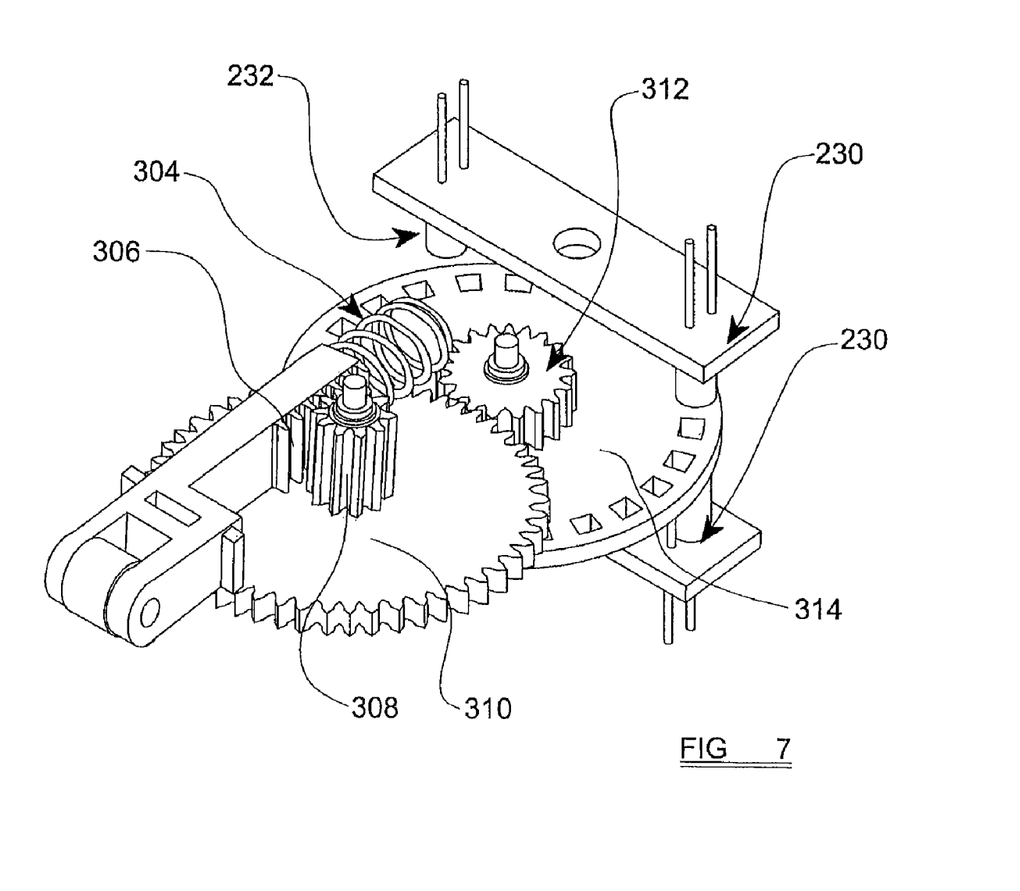
FIG. 7 is a perspective view from below of the device of FIGS. 5 and 6, but with the whole of the casing removed for purposes of illustration.

FIGS. 5, 6 and 7 show an alternative, and currently preferred, form of thickness measuring device 15 for the shredder. In this device, the pivotable element 200 of FIG. 4 is replaced by an actuating element in the form of a probe member 300 which is guided in a casing 302 for longitudinal rectilinear displacement. The member 300 is urged longitudinally outwards from the casing 302, through the slot 22 and into the passage 3 by a light spring 304, (see FIG. 7). The spring biased probe member 300 carries at its outer end a roller 301 for engagement with paper fed through the feed passage 3 or for engagement with the opposing passage wall 5 when no paper is present. Part of the probe member 300 is formed as a rack providing a series of gear teeth 306 along one side of the member 300 which mesh with gear teeth of a pinion 308. The pinion 308 is fixed to a co-axial gearwheel 310 of much larger diameter than pinion 308, which gearwheel 310 overlaps a slotted disc 314, corresponding to the disc 228 in FIG. 4, and meshes with a small diameter pinion 312 fixed to that disc and co-axial therewith, the gearwheel 310 and disc 314 being rotatable about their respective parallel axes in the casing 302. As with the arrangement of FIG. 4, the disc 314 is provided with a series or track of equally spaced radial slots therearound and two optical sensors 230, 232 are provided straddling the annular track of slots around the disc 314, each sensor comprising a respective photo detector on one side of the disc and a respective LED on the opposite side of the disc, the optical detectors again being positioned somewhat out of phase with each other in the same manner as described with respect to FIG. 4 so that the shredder microprocessor, or ancillary circuitry dedicated to the sensor disc 314, can determine not only the extent of rotation of the disc but can determine the direction of displacement of the probe 300 in addition to the extent of such displacement.

The thickness gauging devices described with reference to FIG. 4 and FIGS. 5 to 7 allow the thickness measuring facility in the shredder to be self-zeroing. Thus, for example, the microprocessor can be arranged, when the shredder is switched on and before any paper or the like is inserted for shredding, to take the rest position of the thickness measuring mechanism, in which the arm 17 or the probe 300 is in engagement with the opposing wall 5 of the shredder passageway 3, as corresponding to the zero thickness position. In a currently preferred embodiment of the shredding machine, the aforementioned self-zeroing function is performed as a continual process throughout the life of the product, each time that the arm 17 or the probe 300 engages with the opposing wall 5 of the shredder passageway 3, (i.e. whenever there is no paper sheets or the like present within the feed-slot). Providing this self-zeroing function as a continual process in this manner allows the machine to re-calculate the zero thickness position for the arm 17 or probe 300 in order to account for wear to certain parts of the mechanism, such as the arm 17 or the probe 300 itself, the opposing walls of the feed-slot, or any of the trigger gears. This continual self-zeroing function also accounts for changes in ambient temperature and possible distortion of the opposing walls of the feed-slot. This arrangement thus allows the zero thickness position of the arm 17 or the probe 300 to be continuously re-calibrated to suit the current conditions during the life of the product, and also offers a significant advantage in that it eliminates the need for accurate setting of the option sheet capacity threshold during assembly of the product at the manufacturing stage.

If a stack of paper sheets or the like is inserted into the feed slot 3 so as to pass between the wall 5 and the arm 17 or probe roller 301 and that stack of papers has a thickness, (sensed by displacement of the arm 17 or probe roller 301), less than the optimal sheet capacity threshold thickness determined for the time being by the shredder processor, then the electric motor powering the cutting mechanism will be switched on in response to signals from the lower level photo-sensor 38 and the paper will be shredded, with the motor being switched off again once the paper has cleared the sensor 38. However, should a stack of papers be inserted into the feed slot which has a thickness, (sensed by displacement of the arm 17 or probe roller 301), greater than the optional sheet capacity threshold thickness, the shredder microprocessor will prevent energisation of the cutter motor and thus prevent operation of the cutting mechanism located below the feed slot, even when the leading edge of the stack passes the lower level photo-sensor 38. The microprocessor will also light a warning lamp to signal that the paper bundle inserted is too thick.

Figure 8A:
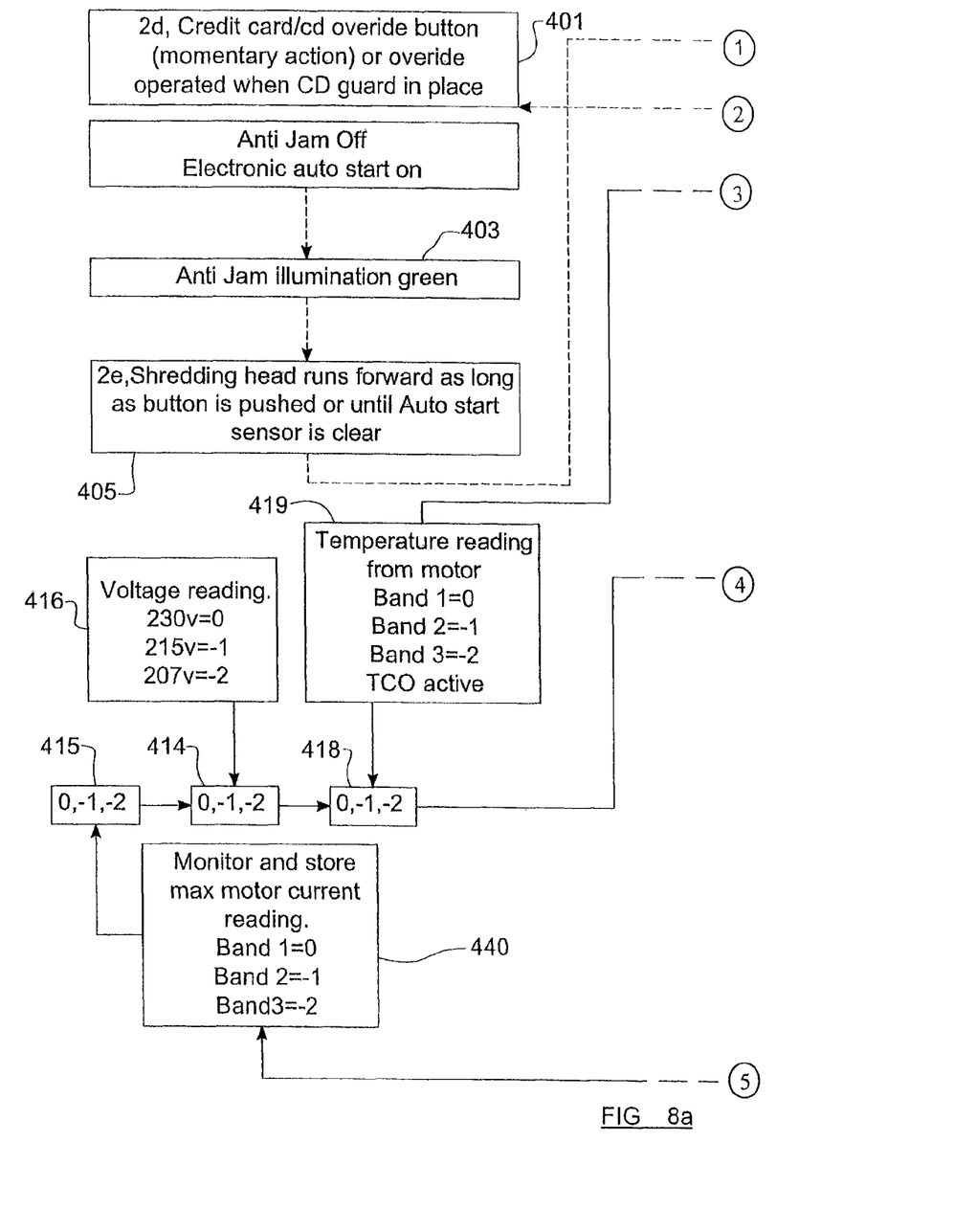
FIGS. 8a through 8c are a logic diagram related to the shredder of the present invention.
Figure 8B:
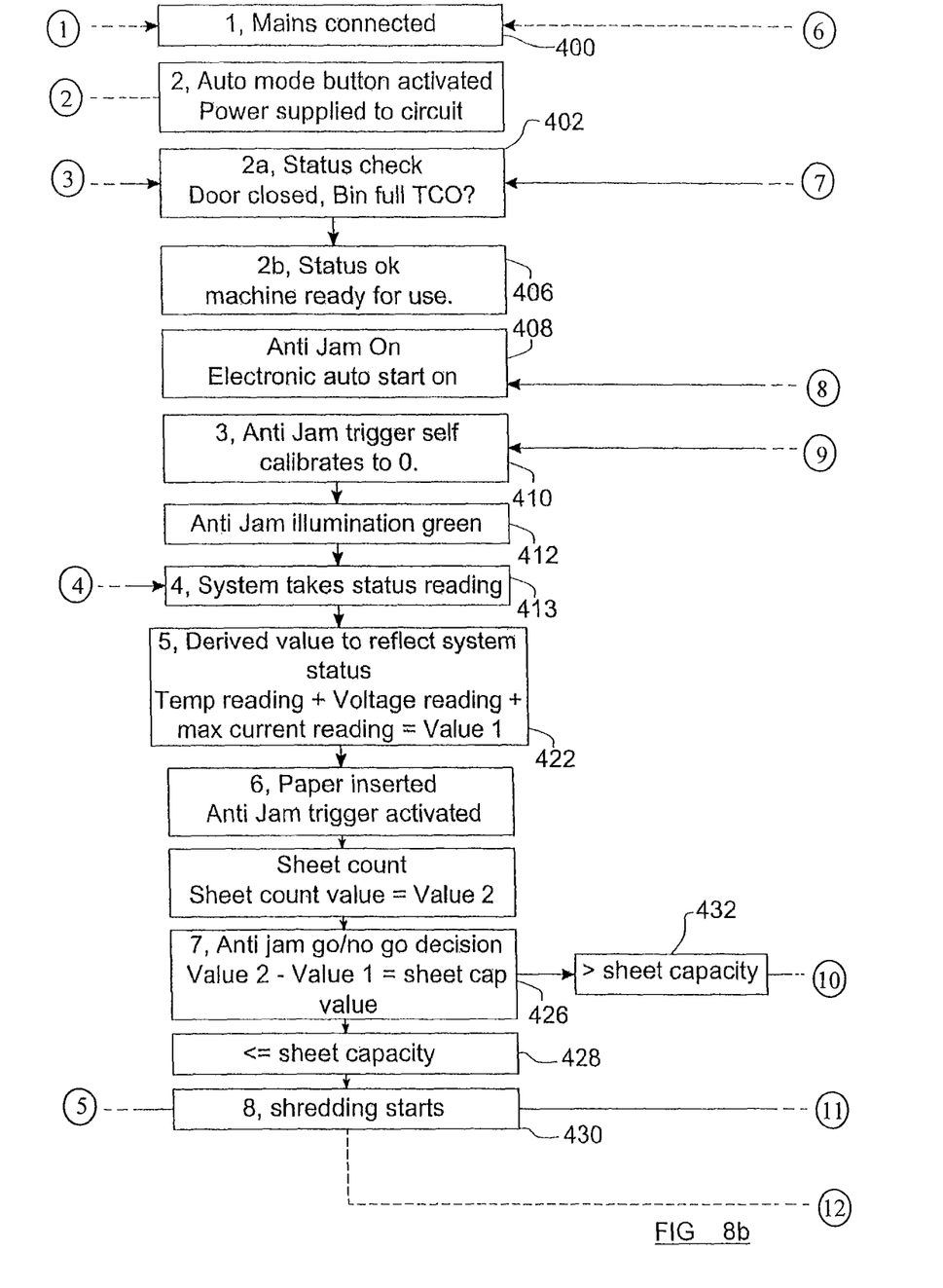
Figure 8C:
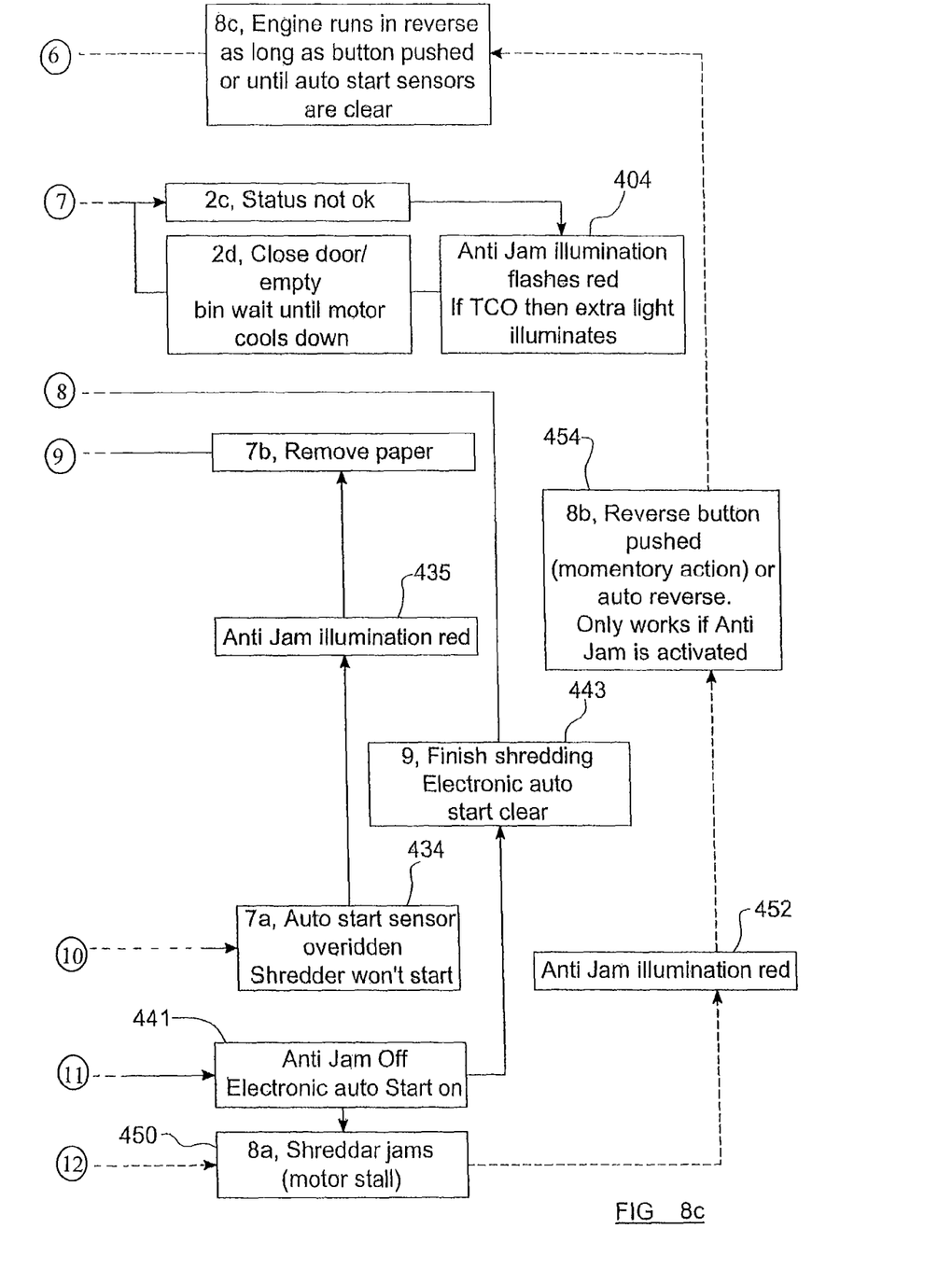

FIGS. 8a through 8c show a logic diagram or flow chart for the shredder microprocessor. Considering the portion of the diagram which is of relevance to the present invention, at stage 400, the processor is initialised and, assuming that the shredder has been set to shred automatically sheets fed into passage 3, the microprocessor at 402 checks that motor temperature (signalled from stage 404) is not excessive, that the shredder is properly closed and that the bin for shredded material is not full. If any of these conditions is present, a warning light is illuminated at 404 and the shredder will not proceed further until the deficiency is remedied. If none of these conditions is present, the processor proceeds via stage 406 to stage 408 where the optimal capacity mode of operation is enabled. The processor then, at stage 410, calibrates the thickness-sensing mechanism to zero, illuminates (at 412) a light to signal that the optimal capacity feature is operational, then checks (stage 413) the sensed motor current (stored at 415 from the previous use of the shredder), the mains voltage (box 414, 416) and motor temperature (boxes 418, 419) and determines at stage 422, (using a predetermined scheme or algorithm which takes into account the sensed motor current from store 415, the sensed mains voltage, and the sensed motor temperature), the appropriate optimal sheet capacity thickness threshold.

When paper is inserted, as sensed by sensor 38, (see above), the shredder motor runs, feeding the inserted sheets past the sensing arm 17 or probe 300. At stage 426, the processor determines whether the thickness actually sensed is below or at or above the optimal capacity threshold and if the sensed thickness is below or at the threshold allows shredding to proceed (stages 428, 430). If the processor determines (stages 432, 434) that the thickness of the paper bundle fed into passage 3 is excessive, the processor does not energise the shredder motor but actuates a warning light at 435 to inform the operator that too much paper has been inserted and once the paper has been removed from the passage 3, the processor returns to stage 410. If the optimal capacity threshold is not reached or exceeded, the inserted paper is shredded (stage 430), whilst the motor current is monitored at 440 and stored at 415. The optimal sheet capacity thickness-measuring facility is deactivated (stage 441) during shredding until the inserted paper clears the sensor 38 (stage 443). The reason for this is that when paper is shredded it ripples and flaps within the feed passage 3, which can cause the arm 17 or probe 300 to be constantly moved and can cause false readings as to the amount of paper inserted.

Once the inserted paper has been shredded and has passed the sensor 38 (stage 443), the processor returns to stage 408 once again, re-activating the optimal sheet capacity thickness-measuring facility.

If, during shredding, the shredder jams, despite the thickness monitoring, this condition is sensed at 450, a warning light is lit (stage 452) and the shredder motor and hence the shredder mechanism is reversed, either automatically or by operation of a manual switch (stage 454), to free the jam. The processor then returns to the initial stage 400.

The preferred embodiment of the invention is also operable to break up CDs, or credit cards. When used for this purpose, the thickness measuring optimal sheet capacity facility is by-passed (stages 401,403,405) whilst the CD or credit card is being broken up. A manual switch or optical detector may be used to inform the processor that the optimal capacity facility is to be by-passed.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A shredding machine for shredding sheet material, the machine comprising a feed aperture and a cutting mechanism powered by an electric motor, the feed aperture being arranged to receive sheets for shredding and to direct such sheets to the cutting mechanism for shredding, the machine having means for measuring the thickness of sheet material passed into said feed aperture for shredding which sheet material may comprise a plurality of superimposed sheets which together provide such thickness, said measuring means controlling said cutting mechanism so as to permit energisation of the cutting mechanism where the thickness of sheet material measured thereby is below a controlling threshold and to prevent such energisation where the thickness of sheet material measured is above said controlling threshold, characterised in that the machine includes at least one sensor sensing a variable supply voltage and control means operable to adjust said controlling threshold automatically in dependence upon the value of the supply voltage sensed.

2. A machine according to claim 1 wherein said measuring means includes an actuating element which is movable from a first limiting position engaging or relatively close to one major wall of said aperture, away from said major wall, against a biasing force acting on said element, and means for measuring displacement of said actuating element from said limiting position.

3. A machine according to claim 2 wherein said means for measuring displacement of said actuating element comprises a marker member provided with a series of markers of alternately high and low light transmissivity or of alternatively high and low light reflectivity and optical sensing means sensitive to the passage of said markers past said sensors, said member being part of, or mechanically coupled with, said actuating element so that the displacement of said actuating element will cause said marker member to move so as to cause said markers to traverse said measuring zone, the apparatus including counting means operable to count displacement of said markers through said measuring zone.

4. A machine according to claim 3 wherein said marker member comprises a disk mounted for rotation about an axis thereof and carrying a co-axial gear pinion which forms with said actuating element, part of a gear train adapted to convert movement of said actuating member into a rotational movement of substantially greater magnitude of said disk, said series of markers being arranged in an annular track around said disk.

5. A machine according to claim 4 wherein said optical sensing means comprises two optical sensors disposed at different positions along said series of markers, said positions being such that light signals received by the two sensors as said marker member is moved are displaced in phase from one another to an extent to allow said control means to determine the direction of displacement of the marker member as well as the extent of such movement.

6. A machine according to claim 5 wherein said actuating element engages said one major wall of said passage when no such sheet material is present therein, the apparatus including control means which is arranged, at times during operation of the machine when said actuating element is in engagement with said major wall of the apparatus, to adopt the corresponding position of said actuating element as corresponding to zero material thickness.

7. A machine according to claim 4 wherein said optical sensing means comprises two optical sensors disposed at different positions along said series of markers, said positions being such that light signals received by the two sensors as said marker member is moved are displaced in phase from one another to an extent to allow said control means to determine the direction of displacement of the marker member as well as the extent of such movement.

8. A machine according to claim 7 wherein said actuating element engages said one major wall of said passage when no such sheet material is present therein, the apparatus including control means which is arranged, at times during operation of the machine when said actuating element is in engagement with said major wall of the apparatus, to adopt the corresponding position of said actuating element as corresponding to zero material thickness.

9. A shredding machine for shredding sheet material, the machine comprising a feed aperture and a cutting mechanism powered by an electric motor, the feed aperture being arranged to receive sheets for shredding and to direct such sheets to the cutting mechanism for shredding, the machine having a thickness measuring device for measuring the thickness of sheet material passed into said feed aperture for shredding which sheet material may comprise a plurality of superimposed sheets which together provide such thickness, said thickness measuring device controlling said cutting mechanism so as to permit energisation of the cutting mechanism when the thickness of sheet material measured thereby is below a controlling threshold and to prevent such energisation when the thickness of sheet material measured is above said controlling threshold, characterised in that the machine includes at least one sensor sensing a variable supply voltage and a processor operable to adjust said controlling threshold automatically in dependence upon the value of the supply voltage sensed.

10. A machine according to claim 9 wherein said processor is operable to adjust said controlling threshold according to a predetermined scheme or algorithm in dependence upon the value of the supply voltage sensed.

11. A machine according to claim 9 wherein said thickness measuring device includes an actuating element which is movable from a first limiting position engaging or relatively close to one major wall of said aperture, away from said major wall, against a biasing force acting on said element, and a measurement device configured to measure the displacement of said actuating element from said limiting position.

12. A machine according to claim 11 wherein said measurement device comprises a marker member provided with a series of markers of alternately high and low light transmissivity or of alternatively high and low light reflectivity, and an optical sensing device sensitive to the passage of said markers past said optical sensing device, said marker member being part of, or mechanically coupled with, said actuating element so that the displacement of said actuating element will cause said marker member to move so as to cause said markers to traverse said measuring zone, the machine further including a counter operable to count displacement of said markers through said measuring zone.

13. A machine according to claim 12 wherein said marker member comprises a disk mounted for rotation about an axis thereof and carrying a co-axial gear pinion which forms with said actuating element, part of a gear train adapted to convert movement of said actuating member into a rotational movement of substantially greater magnitude of said disk, said series of markers being arranged in an annular track around said disk.

14. A machine according to claim 13 wherein said optical sensing device comprises two optical sensors disposed at different positions along said series of markers, said positions being such that light signals received by the two sensors as said marker member is moved are displaced in phase from one another to an extent to allow said processor to determine the direction of displacement of the marker member as well as the extent of such movement.

15. A machine according to claim 14 wherein said actuating element engages said one major wall of said passage when no such sheet material is present therein, the processor being configured, at times during operation of the machine when said actuating element is in engagement with said major wall, to adopt the corresponding position of said actuating element as corresponding to zero material thickness.

16. A machine according to claim 12 wherein said optical sensing device comprises two optical sensors disposed at different positions along said series of markers, said positions being such that light signals received by the two optical sensors as said marker member is moved are displaced in phase from one another to an extent to allow said processor to determine the direction of displacement of the marker member as well as the extent of such movement.

17. A machine according to claim 16 wherein said actuating element engages said one major wall of said passage when no such sheet material is present therein, the processor being configured, at times during operation of the machine when said actuating element is in engagement with said major wall, to adopt the corresponding position of said actuating element as corresponding to zero material thickness.

* * * * *

UNITED STATES PATENT AND TRADEMARK OFFICE
CERTIFICATE OF CORRECTION

PATENT NO.         : 8,162,244 B2
APPLICATION NO.    : 12/182488
DATED              : April 24, 2012
INVENTOR(S)        : Aries et al.

Page 1 of 1

It is certified that error appears in the above-identified patent and that said Letters Patent is hereby corrected as shown below:

In claim 7, column 10, line 36, "according to claim 4" should be --according to claim 3--.

Signed and Sealed this
Fifth Day of June, 2012

David J. Kappos
*Director of the United States Patent and Trademark Office*